(12) United States Patent
Tang et al.

(10) Patent No.: US 10,951,146 B1
(45) Date of Patent: Mar. 16, 2021

(54) METHOD TO IMPROVE OUTPUT CURRENT HARMONIC DISTRIBUTION IN A SEGMENTED DRIVE SYSTEM

(71) Applicant: KARMA AUTOMTOIVE LLC, Irvine, CA (US)

(72) Inventors: Lixin Tang, Irvine, CA (US); Geng Niu, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 0 days.

(21) Appl. No.: 16/565,098

(22) Filed: Sep. 9, 2019

(51) Int. Cl.
| | |
|---|---|
| *H02P 21/05* | (2006.01) |
| *H02P 27/08* | (2006.01) |
| *H02P 21/14* | (2016.01) |
| *H02P 21/22* | (2016.01) |
| *H02M 7/5387* | (2007.01) |

(52) U.S. Cl.
CPC ........ *H02P 21/05* (2013.01); *H02M 7/53871* (2013.01); *H02P 21/14* (2013.01); *H02P 21/22* (2016.02); *H02P 27/08* (2013.01)

(58) Field of Classification Search
CPC .... H02P 21/00; H02P 1/00; H02P 1/04; H02P 1/026; H02P 1/06; H02P 1/08; H02P 1/12; H02P 1/24; H02P 1/26; H02P 1/265; H02P 1/28; H02P 1/32; H02P 1/38; H02P 1/42; H02P 1/44; H02P 1/445; H02P 1/46; H02P 1/54; H02P 3/00; H02P 5/00; H02P 6/00; H02P 6/005; H02P 6/007; H02P 6/04; H02P 6/10; H02P 6/28; H02P 21/0003; H02P 21/0085; H02P 21/0089; H02P 21/12; H02P 21/14; H02P 21/141; H02P 21/28; H02P 21/50; H02P 23/00; H02P 25/00; H02P 27/00; H02P 27/04; H02P 27/06; H02M 7/00; H02M 11/00
USPC ........... 318/400.02, 599, 800, 801, 811, 727, 318/400.14, 400.15, 700, 701, 721, 432
See application file for complete search history.

(56) References Cited

U.S. PATENT DOCUMENTS 8,278,850 B2 * 10/2012 Gallegos-Lopez ..........................
H02M 7/53873
318/400.02
8,373,372 B2 2/2013 Su
(Continued)

OTHER PUBLICATIONS

Feng Yang, et al.; "Research on Parallel Interleaved Inverters with Discontinuous Space-Vector Modulation"; Scientific Research; Energy and Power Engineering; Published on-line Jul. 2013; vol. 5, pp. 2019-225.

(Continued)

*Primary Examiner* — Antony M Paul
(74) *Attorney, Agent, or Firm* — Gordon Rees Scully Mansukhani, LLP (57) ABSTRACT

A segmented electrical drive system comprising a DC power bus comprising a DC voltage supply and a capacitor in parallel, an inverter comprising a plurality of inverter segments, a motor including a plurality of stator winding segments each connected to an inverter segment, and a controller. The controller receives a control signal and sends a switching signal to each of the inverter segments, wherein the switching signal is based on a discontinuous space vector pulse width modulation (DSVPWM) scheme for a segmented inverter. The DSVPWM scheme includes a set of reverse sawtooth carrier signals that are at an optimal phase shift angle with respect to each other.

20 Claims, 11 Drawing Sheets

(56) References Cited

U.S. PATENT DOCUMENTS

| | | | |
|---|---|---|---|
| 8,441,828 B2 | 5/2013 | Damson et al. | |
| 8,450,957 B2* | 5/2013 | Ding | H02P 27/12 |
| | | | 318/400.02 |
| 8,649,195 B2 | 2/2014 | Mao et al. | |
| 9,419,549 B2* | 8/2016 | Yim | H02P 27/08 |
| 9,595,902 B2* | 3/2017 | Gallegos-Lopez | H02P 21/18 |

OTHER PUBLICATIONS

Gui-Jia Su; "A Segmented Drive Inverter Topology With a Small DC Bus Capacitor"; Oak Ridge National Laboratory; Managed by UT-Battelle for the U.S. Department of Energy; Project ID: APE004; May 15, 2012; U.S. DOE Hydrogen and Fuel Cells Program and Vehicle Technologies Program Annual Merit Review and Peer Evaluation Meeting.

* cited by examiner

METHOD TO IMPROVE OUTPUT CURRENT HARMONIC DISTRIBUTION IN A SEGMENTED DRIVE SYSTEM

BACKGROUND

The present disclosure relates to a method for operating a segmented electrical drive system.

The goal of the drive system for the motor of an electric vehicle is to create a smoothly rotating magnetic field with an assigned magnitude and direction (a vector) to control the rotation of the wheels. In order to create this magnetic field vector (the "net vector") in a brushless motor, it is necessary for the drive system to add together a plurality of base vectors produced by the stator coils. The stator coils are at fixed positions around the stator, but it is still possible for the drive system to produce the net vector by varying the magnitude and polarity of the base vectors.

The drive system is able to control the base vectors' magnitudes and polarities by using a plurality of variable voltage AC signals, but the power source for an electric motor drive system is a DC battery with a fixed voltage level. The role of the inverter in an electric motor drive system is to convert the fixed voltage DC source into the plurality of variable AC signals needed to control the motor. The inverter cannot change the voltage coming from the fixed voltage DC source directly, but it can simulate a variable voltage AC signal by using "pulse width modulation"—switching the connection to the fixed voltage DC source on and off in a specific pattern to mimic the rise and fall of a variable voltage AC signal.

The controller of an electric motor drive system is responsible for determining the switching sequence needed to produce the desired variable voltage AC signals. First, the controller must determine the magnitude and polarity of each of the desired base vectors. Then, for each base vector to be produced, the controller calculates the AC signal needed to produce those magnitudes—this calculated signal is called the "reference signal." Once the controller has a reference signal, it compares the reference signal to a "carrier signal"—a basic, high frequency signal used to create a modulated signal that approximates the reference signal by varying one or more properties of the carrier signal to match the reference signal. In this case, in order to create the modulated signal (as used here, a signal modulated by pulse width), the controller overlays the reference signal on top of the carrier signal. Based on where the reference signal intersects the carrier signal and whether or not the carrier signal value exceeds the reference signal value at a given time, the controller sets the modulated signal value at either digital low or digital high.

The modulated signal is what the controller sends to the inverter switches in order to produce the switching cycle—a modulated signal value of digital high opens the switch and a modulated signal value of digital low closes the switch (or vice versa). For example, in a three-leg inverter, three sets of switches each open and close in rapid sequence, creating the three pulse width modulated signals that act as the AC signals for the motor. From these AC signals, the stator produces the base vectors needed to create the net vector and the directional magnetic field.

The switching process results in the creation of a ripple current "upstream"—although the DC voltage source is meant to be at a fixed voltage value, the variance in load results in a ripple current at the source. This ripple current is highly undesirable—it wastes power, heats components, degrades the battery, and impairs performance. It is possible to reduce and/or level out the ripple current by adding a capacitor in parallel to the DC voltage source, but inefficiencies in an inverter system require larger and larger capacitors, depending on how severe the inefficiencies are.

To reduce the inefficiencies resulting in a DC bus ripple current, U.S. Pat. No. 8,373,372 ("Su") discloses a segmented inverter, which essentially utilizes two inverters with their associated stator coils in parallel with each other. By introducing a phase shift between the signals of the two inverter segments (specifically, a phase shift between the carrier signals), Su's segmented drive system reduces the ripple current and therefore reduces the capacitance needed to keep the DC bus stable.

Ripple current is not the only concern for an inverter's efficiency. The process of flipping inverter switches on and off results in some power loss, in this context called "switching loss." It is possible to reduce the switching loss of an inverter by reducing the amount of switching performed. The most effective way of accomplishing a reduced switching loss is by using a "discontinuous" switching scheme where only some of the switch sets are pulse modulating at any given time, but this approach leads to a largely increased ripple current, negating the benefits of the segmented drive system disclosed by Su. Further, the discontinuous switching scheme results in increased total harmonic distortion, which risks harming the system.

It is desirable to find a method of operating a segmented drive system that reduces switching loss, reduces the capacitor ripple current, and improves the total harmonic distribution of the output current.

SUMMARY

Disclosed herein is a segmented electrical drive system. In one embodiment, the drive system comprises a DC power bus, an inverter connected to the DC power bus, a motor connected to the inverter, and a controller for operating the inverter. In one embodiment, the DC power bus comprises a DC voltage supply and a capacitor connected in parallel with the DC voltage supply. In one embodiment, the inverter comprises a plurality of inverter segments, wherein each inverter segment includes a plurality of inverter switch pairs each connected in parallel with the DC power bus. In one embodiment, the motor includes a plurality of stator winding segments. In one embodiment, a stator winding segment in the plurality of stator winding segments is assigned to each inverter segment. In one embodiment, each stator winding segment includes at least one stator winding for each inverter switch pair in the plurality of inverter switch pairs of the associated inverter segment. In one embodiment, the controller receives a control signal and sends a switching signal to each of the inverter segments. In one embodiment, the control signal corresponds with a desired stator magnetic field vector. In one embodiment, the switching signal sent to each inverter segment corresponds with a space vector pulse width modulation (SVPWM) used to produce the desired stator magnetic field vector by means of combining a plurality of base vectors produced by the plurality of stator winding segments. In one embodiment, each base vector is produced by an inverter switch pair's activity to generate a pulse width modulated signal according to a SVPWM schedule through its corresponding at least one stator winding. In one embodiment, at least one stator winding in the plurality of stator winding segments is not driven by any inverter switch pair activity from its corresponding inverter switch pair during a given cycle of the SVPWM schedule. In one embodiment, the switching signal to produce the pulse width modulated signal of each inverter switch pair is determined by comparing a carrier signal to a reference signal.

In another disclosed embodiment, the carrier signals associated with each of the plurality of inverter switch pairs are sawtooth carrier signals. In another disclosed embodiment, the carrier signals associated with each of the plurality of inverter switch pairs are reverse sawtooth carrier signals.

In another disclosed embodiment, the carrier signals and reference signals associated with an inverter segment are at an optimal phase shift angle with respect to the carrier signals and pulse width modulated signals associated with each other inverter segment in the plurality of inverter segments. In another disclosed embodiment, the optimal phase shift angle is determined by the use of a mathematical model of the inverter. In another disclosed embodiment, the optimal phase shift angle is a fixed value during operation of the drive system. In another disclosed embodiment, the implementation of an optimal phase shift angle reduces a ripple current of the capacitor.

Other aspects, features, and techniques will be apparent to one skilled in the relevant art in view of the following detailed description of the embodiments.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

One aspect of the disclosure is directed to a method of operating a segmented electric motor drive system, wherein the method uses optimum phase shift control with a special discontinuous space vector pulse width modulation (SDSVPWM) to improve the system's output current harmonic characteristics while keeping the DC bus current ripple at a low value.

References throughout this document to "one embodiment," "certain embodiments," "an embodiment," or similar term mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. For example, two or more of the innovative methods or systems described herein may be combined in a single method or system, but the application is not limited to the specific exemplary combinations of the methods or segmented electric motor drive systems that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The character "N" refers hereinafter to the last member of a set or the total count of members in a set. The character "X" refers hereinafter to a variable member of a set. The characters "A", "B", "C", etc. refer to a specific but otherwise undefined member of a set.

As used herein, the term "input ripple current" refers to the ripple current measurable at a voltage source of a DC power bus and the term "capacitor ripple current" refers to the ripple current measurable at a capacitor of a DC power bus.

A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

Figure 1:
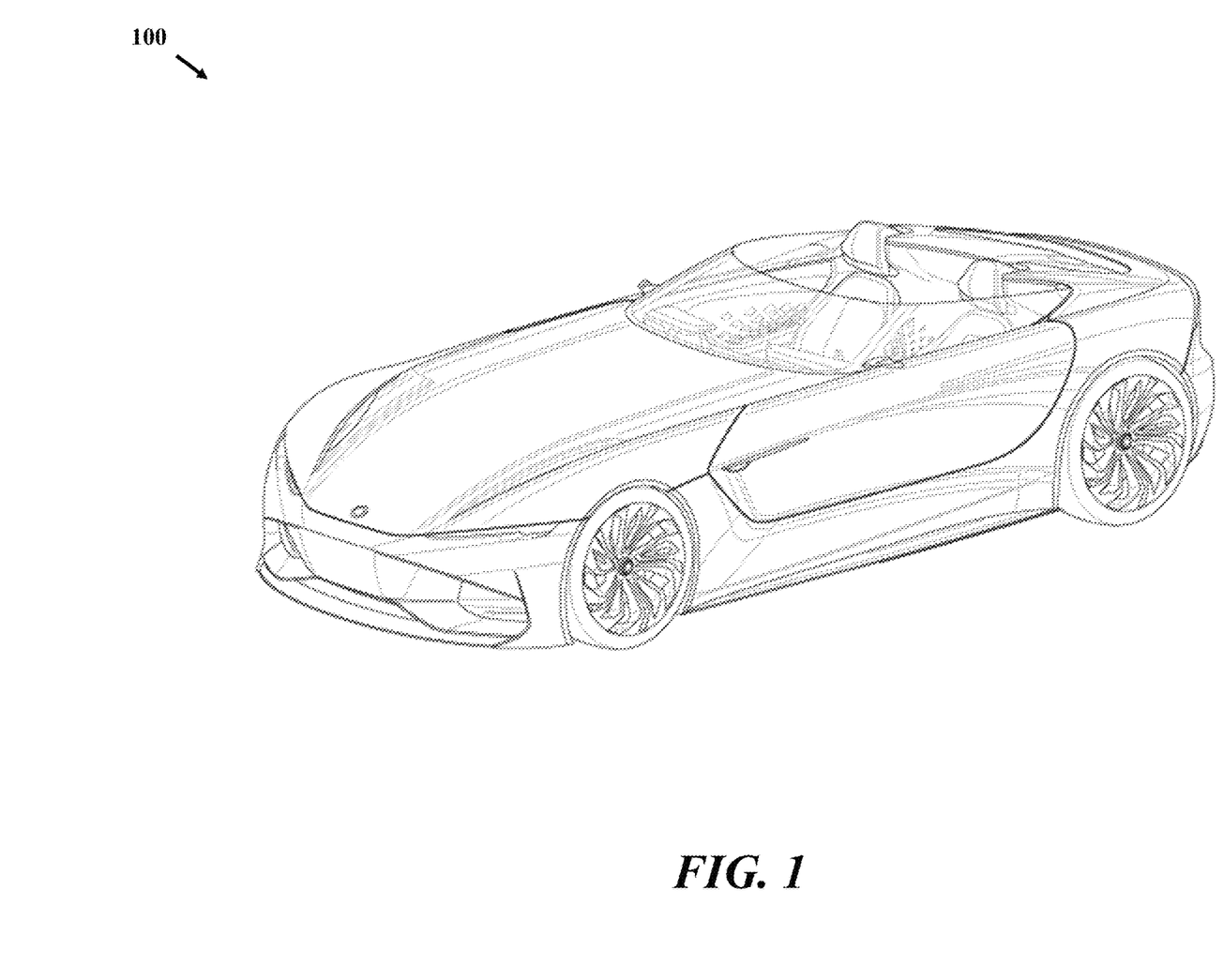
FIG. 1 is a perspective view depicting an exemplary embodiment of an electric vehicle in which a segmented drive system may be installed.

FIG. 1 is a perspective view depicting an exemplary embodiment of an electric vehicle 100 in which a segmented drive system 200 may be installed. The electric vehicle 100 depicted here is exemplary. The segmented drive system 200 may be installed in any vehicle with use for an electric motor drive system.

Figure 2:
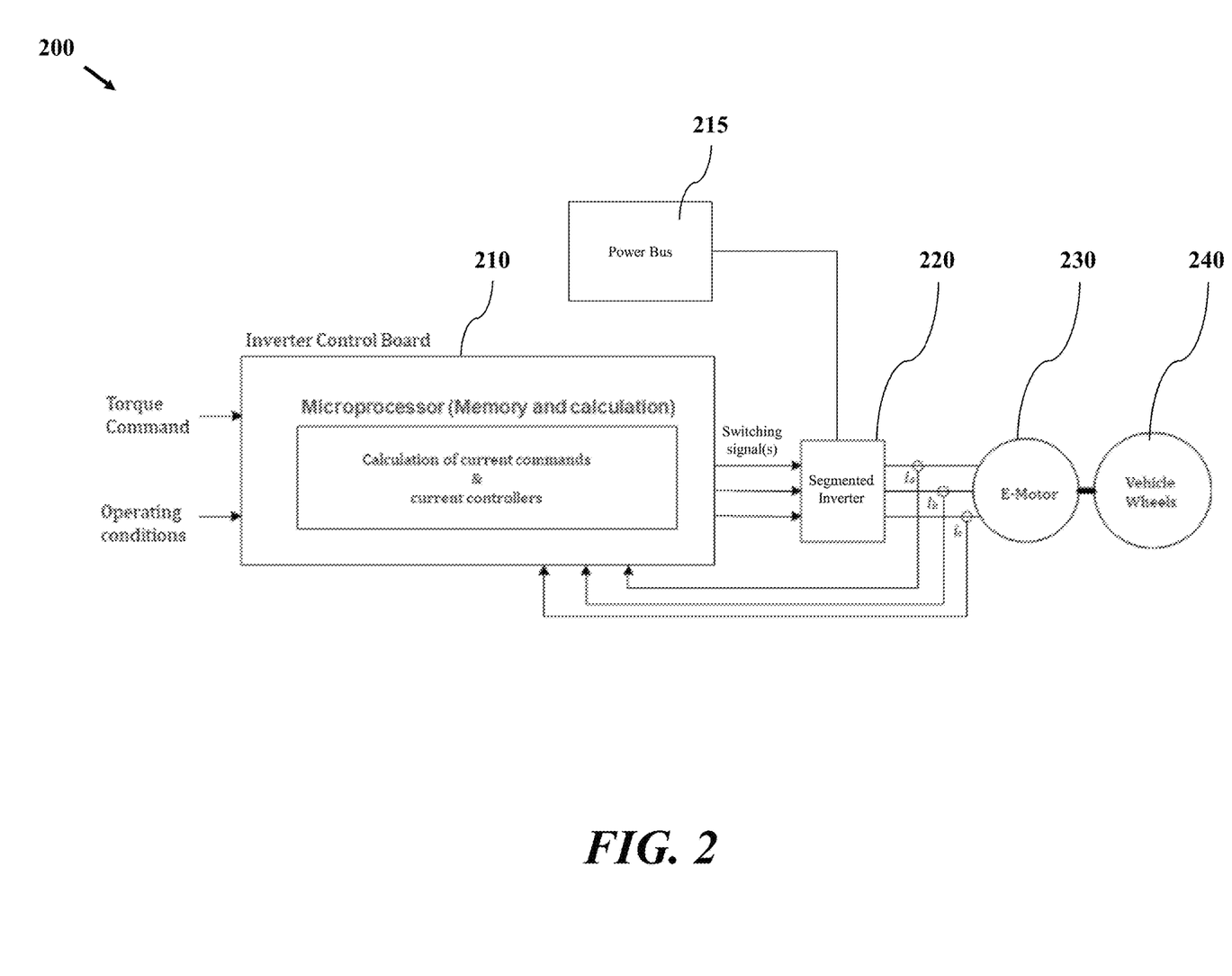
FIG. 2 is a block diagram depicting an exemplary embodiment of a segmented drive system.

FIG. 2 is a block diagram depicting an exemplary embodiment of a segmented drive system 200. In one embodiment, the segmented drive system 200 may include a controller 210, a DC power bus 215, a segmented inverter 220, an electric motor 230, and a plurality of vehicle wheels 240. The method of operation may be installed as part of the controller 210, which in one embodiment is designed to control the segmented inverter 220 at its commanded value with a good dynamic and steady-state response. In one embodiment, the segmented inverter 220 feeds power to the electric motor 230, and the electric motor 230 in turn applies torque to a plurality of vehicle wheels 240. In one embodiment, the segmented inverter 220 may receive power from a DC power bus 215 and convert the received DC power into at least one AC signal.

In one embodiment, the controller 210 receives a control signal corresponding to a desired stator magnetic field vector. The control signal may comprise a torque command related to a desired value of rotational force to be applied to at least one vehicle wheel in the plurality of vehicle wheels 240. In one embodiment, the controller 210 receives data related to the operating conditions of the segmented drive system 200 and other parts of the electric vehicle 100. In one embodiment, the controller 210 produces an inverter signal to be sent to each of the inverter segments 225. The switching signal may be calculated using a space vector pulse width modulation (SVPWM) process to produce the desired stator magnetic field vector by means of combining a plurality of base vectors.

Figure 3:
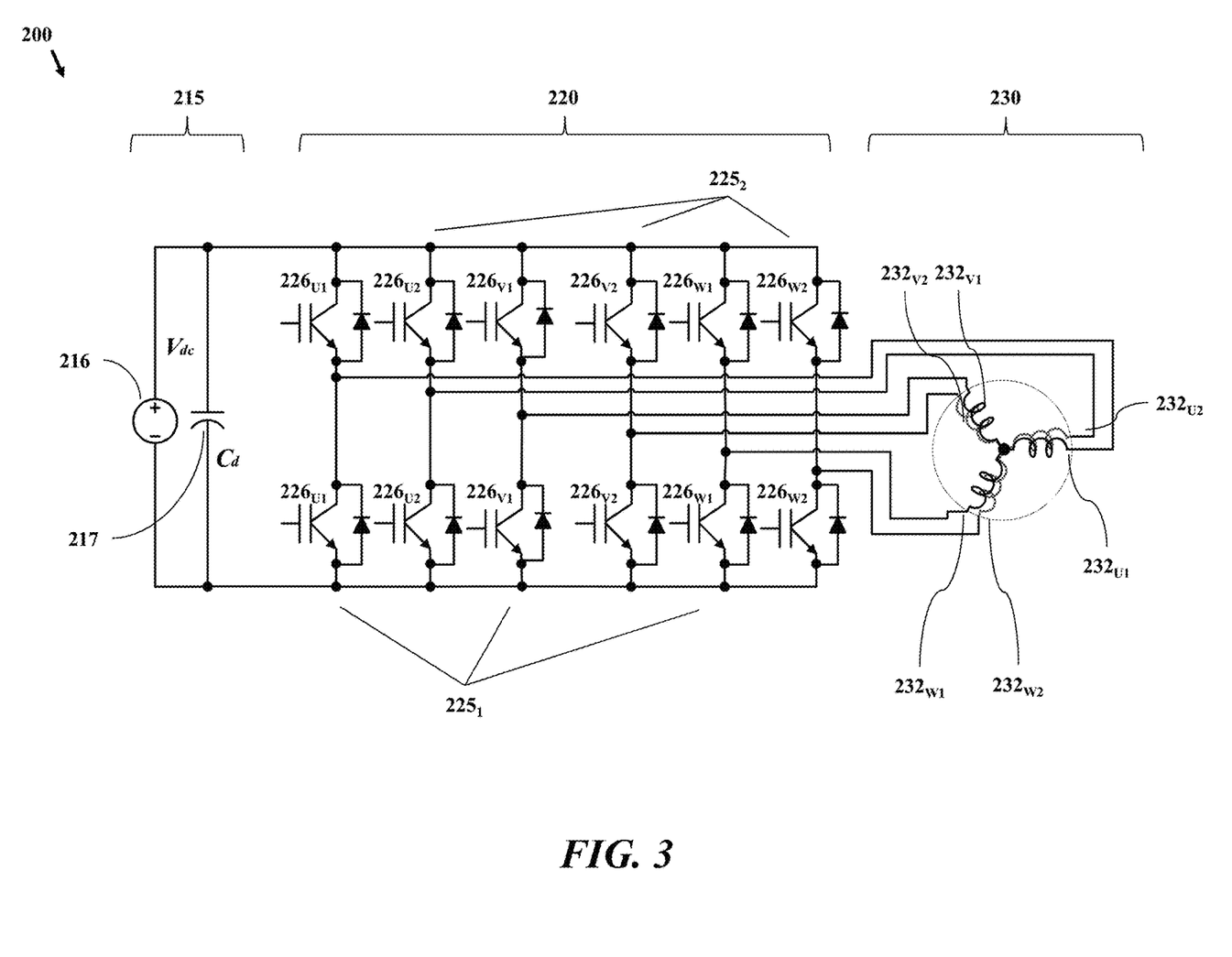
FIG. 3 is a circuit diagram depicting an exemplary embodiment of a segmented drive system.

FIG. 3 is a circuit diagram depicting an exemplary embodiment of a segmented drive system 200.

In one embodiment, the DC power bus 215 may comprise a DC voltage supply 216 providing a voltage value $V_{dc}$ and a capacitor 217 providing a capacitance value $C_d$. The capacitor 217 may act to level out voltage level irregularities caused by factors such as a ripple current, such that the DC power bus 215 provides a steady voltage level to the segmented inverter 220. In one embodiment, a segmented drive system 200 experiencing high ripple current values may require the use of a capacitor 217 with a higher capacitance value $C_d$, thereby increasing the cost of the system.

In one embodiment, the segmented inverter 220 comprises a plurality of inverter segments $225_{1-N}$. In one embodiment, each inverter segment $225_X$ includes a plurality of inverter switch pairs $226_{UX}$, $226_{VX}$, and $226_{WX}$, wherein each inverter switch pair 226 is connected in parallel with the DC power bus 215. The segmented inverter depicted in FIG. 2 includes two inverter segments $225_{1-2}$, but the segmented inverter 220 may include three or more inverter segments 225 depending on the requirements of the segmented drive system 200.

In one embodiment, the electric motor 230 includes a plurality of stator winding segments $235_X$. In one embodiment, each inverter segment $225_X$ is assigned and associated with a stator winding segment $225_X$. In one embodiment, each stator winding segment $235_X$ includes a plurality of stator windings $232_{UX}$, $232_{VX}$, and $232_{WX}$. In one embodiment, each stator winding segment $235_X$ includes at least one stator winding 232 for each inverter switch pair 226 in the plurality of inverter switch pairs $226_{UX}$, $226_{VX}$, and $226_{WX}$ of the associated inverter segment $225_X$.

In one embodiment, the base vectors described above may be produced by the plurality of stator winding segments $235_{1-N}$, wherein each base vector is produced by a stator winding 232. In one embodiment, each base vector produced by a stator winding 232 is produced by the activity of the associated inverter switch pair 226 to generate a pulse width modulated signal according to a SVPWM schedule. In one embodiment, at least one stator winding 232 in the plurality of stator winding segments $235_{1-N}$ is not driven by any inverter switch pair 226 activity from its corresponding inverter switch pair 226 during a given cycle of the SVPWM schedule. The SVPWM schedule wherein at least one stator winding is not driven by any inverter switch pair activity during a given cycle may be described as discontinuous space vector pulse width modulation (DSVPWM).

Figure 4A:
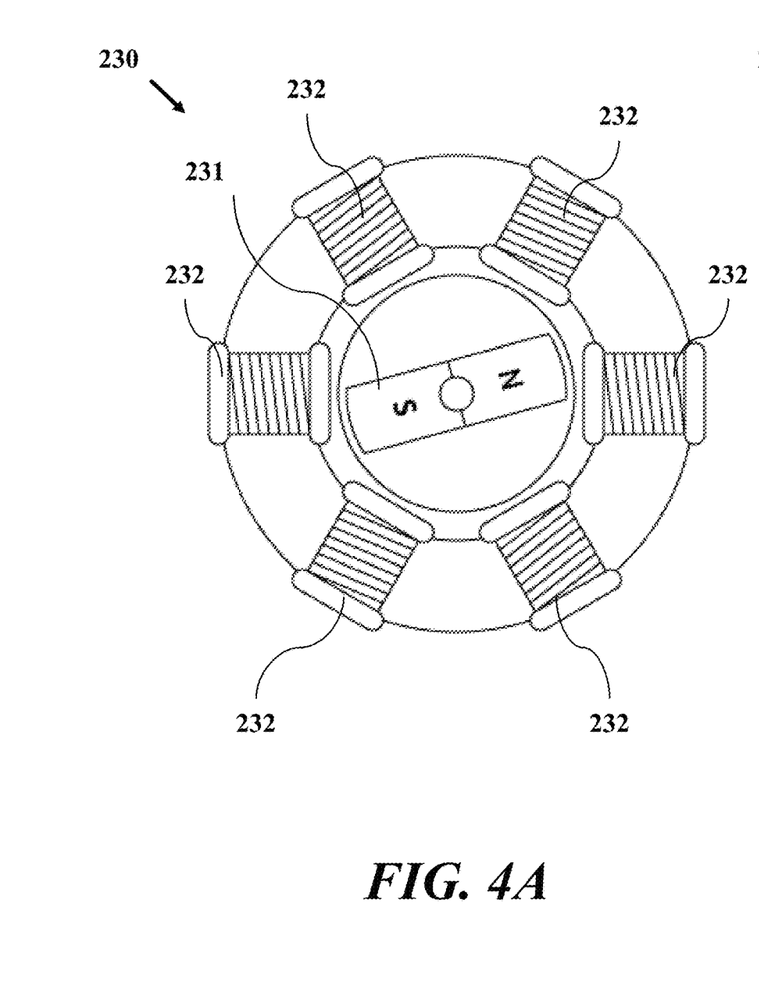
FIG. 4A is a side view depicting an exemplary embodiment of an electric motor for an electric vehicle.

FIG. 4A is a side view depicting an exemplary embodiment of an electric motor 230 for an electric vehicle 100. In one embodiment, the electric motor 230 includes a rotor 231 and a stator with a plurality of stator windings 232. In one embodiment, the rotor 231 may include a permanent magnet. In one embodiment, the stator windings 232 may receive power from the segmented inverter 220 to produce a magnetic field by means of space vector pulse width modulation. In one embodiment, the electric motor drive system 200 rotates the magnetic field of the stator in order to induce rotation in the rotor 231 and propel the electric vehicle 100. In one embodiment, some of the stator windings 232 may be collocated with some of the other stator windings 232, allowing for the implementation of a segmented drive system such as the segmented drive system 200 depicted in FIG. 2 and FIG. 3.

Figure 4B:
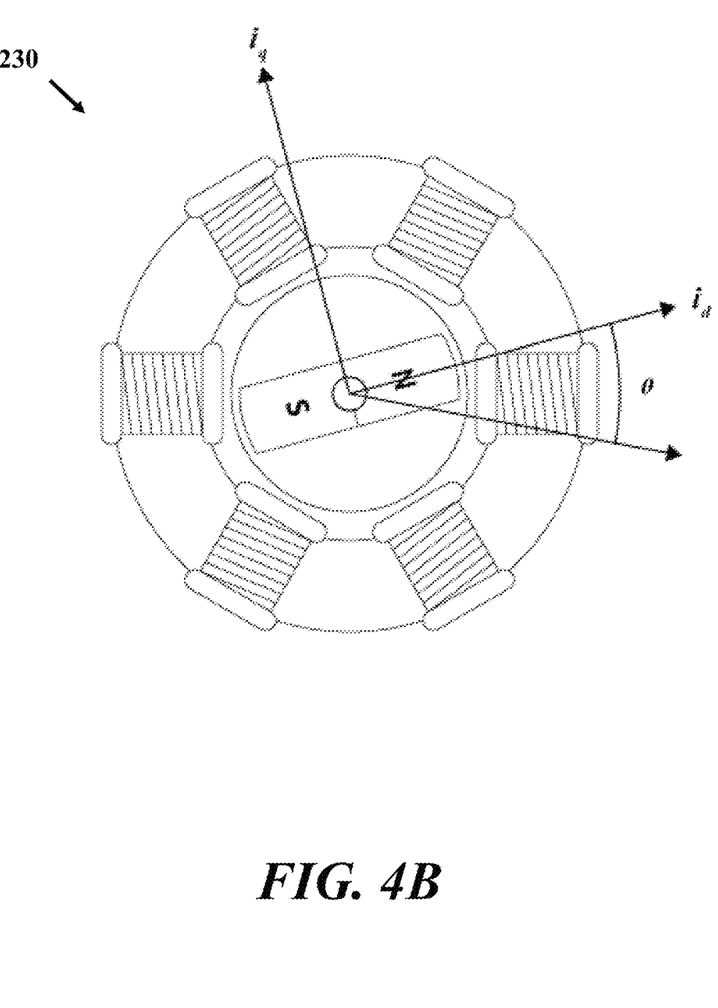
FIG. 4B is a side view depicting an exemplary magnetic field coordinate system for the electric motor of FIG. 3A.

FIG. 4B is a side view depicting an exemplary magnetic field coordinate system for the electric motor 230 of FIG. 4A. In one embodiment, the electric motor 230 has a rotation angle value θ. Rotation angle θ may represent an advance angle of the motor, wherein the advance angle is the angle between the rotating magnetic field of the stator and the rotating magnetic field of the rotor.

Figure 5:
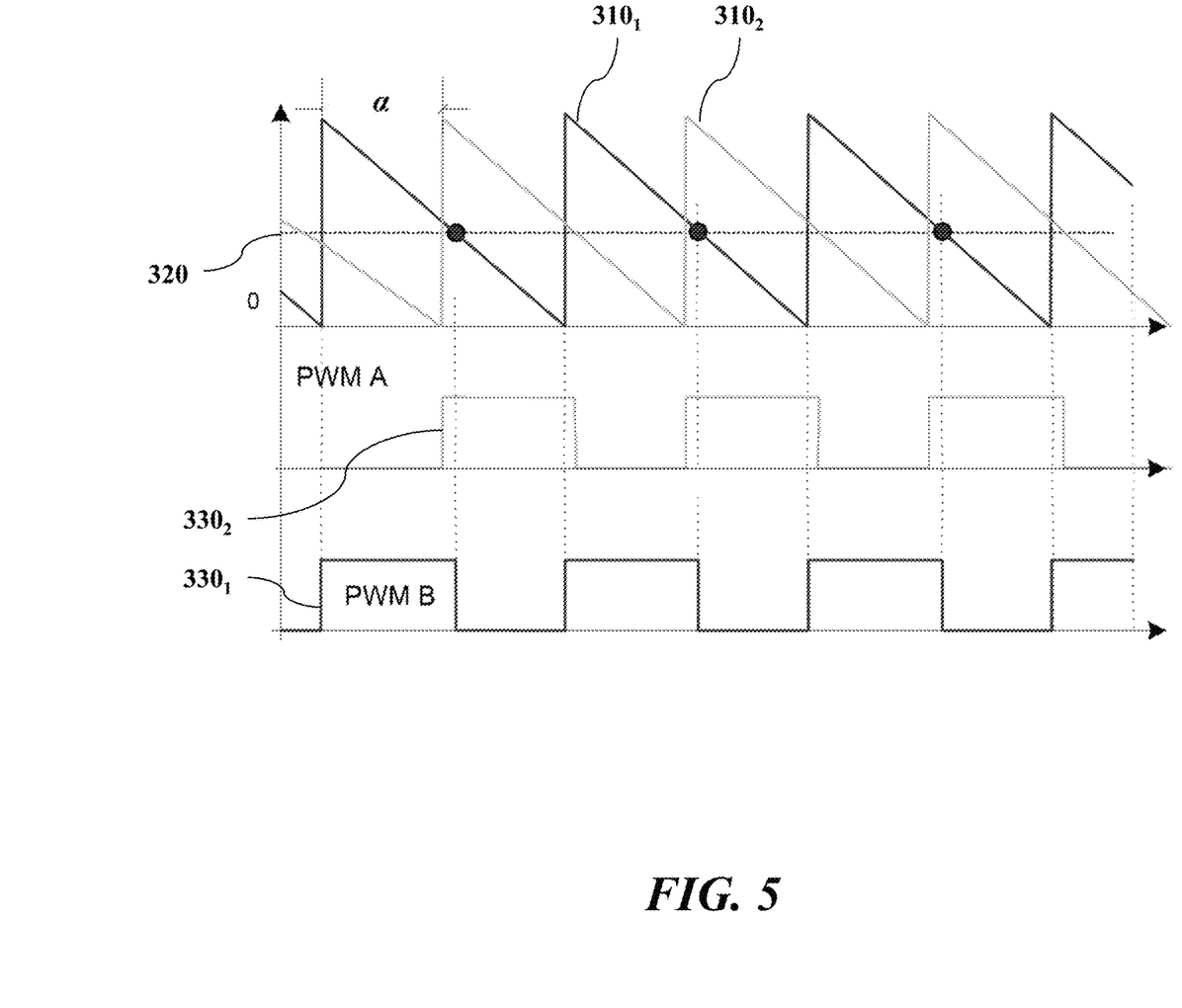
FIG. 5 is a graph depicting an exemplary embodiment of a plurality of carrier signals and a corresponding plurality of modulated signals for a segmented drive system.

FIG. 5 is a graph depicting an exemplary embodiment of a plurality of carrier signals $310_{1-N}$ and a corresponding plurality of modulated signals $330_{1-N}$ for a segmented drive system 200. In one embodiment, the switching signal to produce the pulse width modulated signal of each inverter switch pair 226 is determined by comparing a carrier signal 310 to a reference signal 320. The reference signal may be an AC sinusoidal signal for a set of co-located stator windings 332 to produce a base vector. Each modulated signal 330 in the plurality of modulated signals $330_{1-N}$ may be a pulse width modulated signal configured to replicate an analog AC signal with a digital binary signal.

In one embodiment, each of the plurality of modulated signals $330_{1-N}$ corresponds to one of the inverter segments 225 in the plurality of inverter segments $225_{1-N}$ such that each inverter segment 225 receives a modulated signal 330. In one embodiment, the carrier signals $310_{1-N}$ used to produce the modulated signals $330_{1-N}$ are phase shifted with respect to each other; in one embodiment, the phase shift is a phase shift angle with a value α.

It should be noted that while embodiments of the systems disclosed in this document perform optimally when using reverse sawtooth carrier signals such as the carrier signals depicted in FIG. 5, it is possible to implement a segmented drive system using sawtooth carrier signals or triangle carrier signals.

Figure 6A:
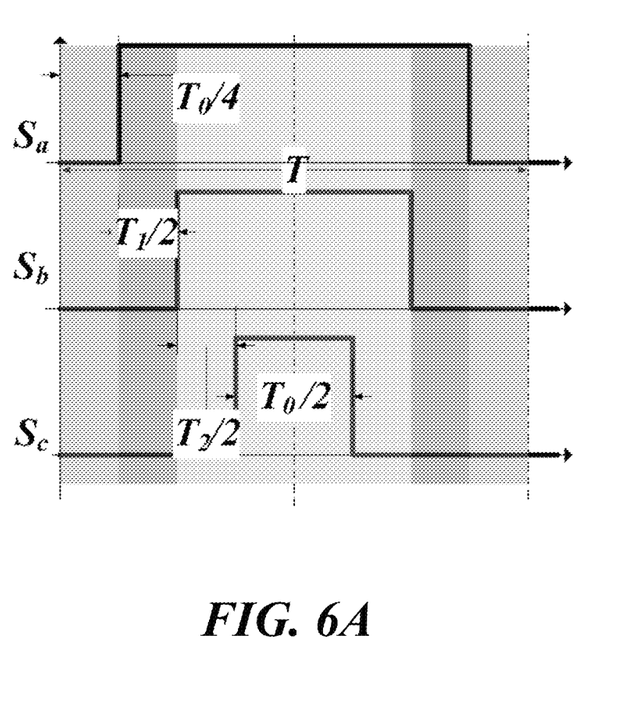
FIG. 6A is a graph depicting an exemplary embodiment of a plurality of modulated signals for a drive system using space vector pulse width modulation.

FIG. 6A is a graph depicting an exemplary embodiment of a plurality of modulated signals for a drive system using SVPWM. In one embodiment, a three-phase motor may operate by means of three stator winding sets and three modulated signals $S_a$, $S_b$, and $S_c$. The three base vectors produced by each of the modulated signals may add together to create the desired stator magnetic field vector.

Figure 6B:
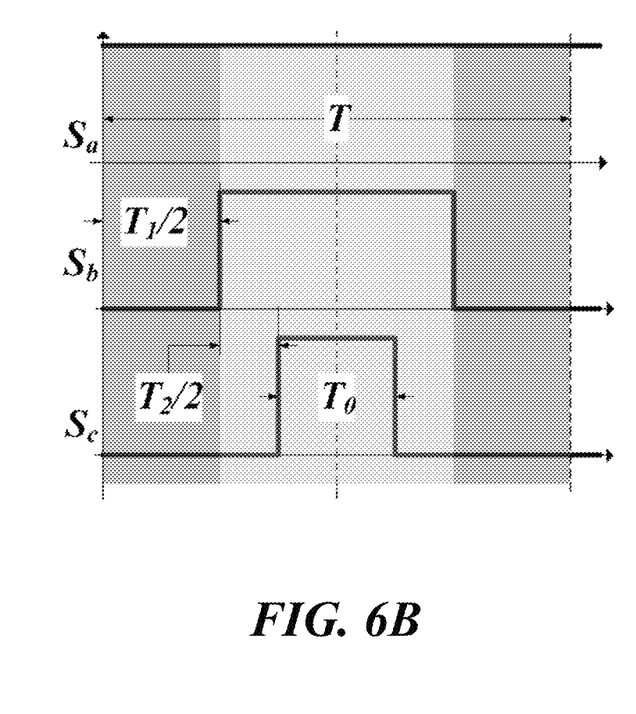
FIG. 6B is a graph depicting an exemplary embodiment of a plurality of a plurality of modulated signals for a drive system using discontinuous space vector pulse width modulation.

FIG. 6B is a graph depicting an exemplary embodiment of a plurality of a plurality of modulated signals for a drive system using DSVPWM. In one embodiment, it is possible to reduce the three base vectors of FIG. 6A down to two base vectors. In this embodiment, the third base vector effectively has a magnitude of zero and the corresponding stator winding set does not operate with any inverter switching activity. In such a case, the modulated signal for that stator winding set (here, $S_a$) remains at a constant value and does not require switching. This may reduce the switching losses incurred by the segmented inverter 220 by up to 33%, but also introduces additional undesired effects into the system such as increased capacitor ripple current, increased input ripple current, and increased total harmonic distortion.

Figure 7A:
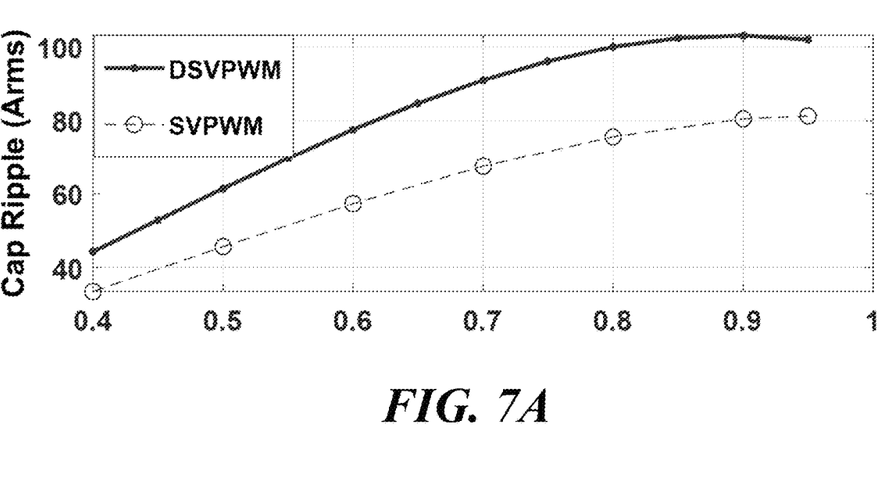
FIG. 7A is a graph depicting a comparison of capacitor ripple current values between an exemplary embodiment of a drive system using SVPWM versus an exemplary embodiment of a drive system using DSVPWM.
Figure 7B:
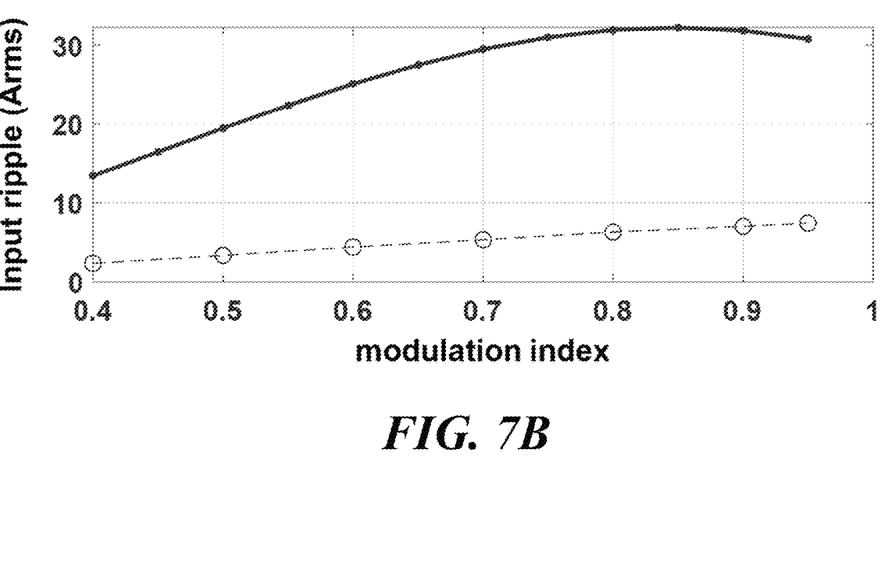
FIG. 7B is a graph depicting a comparison of input ripple current values between an exemplary embodiment of a drive system using SVPWM versus an exemplary embodiment of a drive system using DSVPWM.

FIG. 7A is a graph depicting a comparison of capacitor ripple current values between an exemplary embodiment of a drive system using SVPWM versus an exemplary embodiment of a drive system using DSVPWM. FIG. 7B is a graph depicting a comparison of input ripple current values between an exemplary embodiment of a drive system using SVPWM versus an exemplary embodiment of a drive system using DSVPWM. As shown by FIGS. 7A and 7B, a drive system using a DSVPWM switching scheme incurs a higher capacitor ripple current value (approximately 20% greater) and a significantly higher input ripple current value (over 100% greater) as compared to a drive system using a SVPWM switching scheme, regardless of modulation index.

Figure 8A:
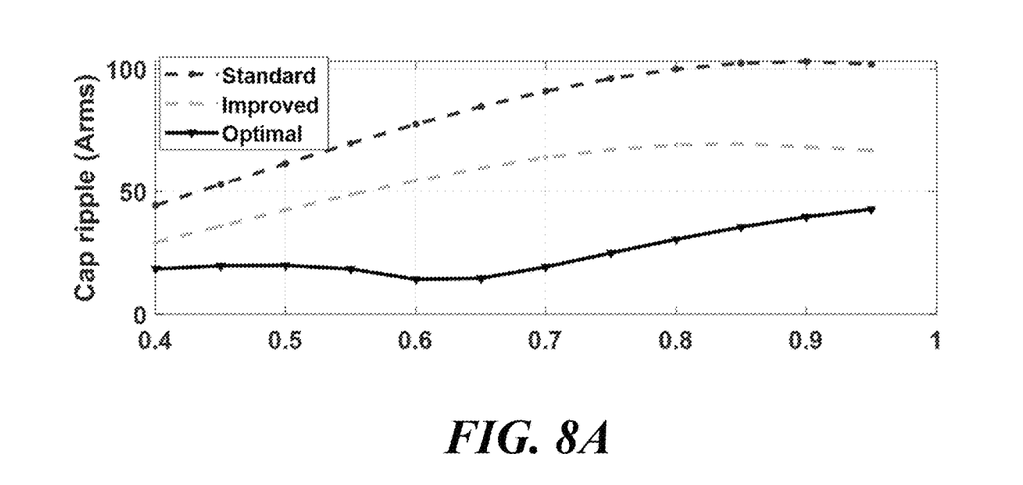
FIG. 8A is a graph depicting a comparison of capacitor ripple current values between exemplary embodiments of segmented drive system using DSVPWM with different phase shift values.
Figure 8B:
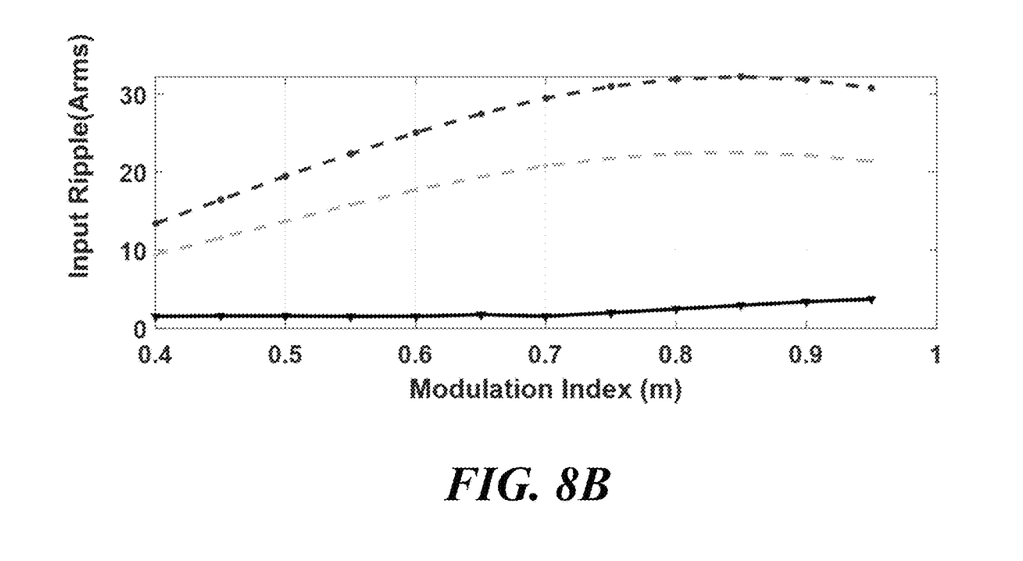
FIG. 8B is a graph depicting a comparison of input ripple current values between exemplary embodiments of segmented drive system using DSVPWM with different phase shift values.

FIG. 8A is a graph depicting a comparison of capacitor ripple current values between exemplary embodiments of segmented drive system using DSVPWM with different phase shift values. FIG. 8B is a graph depicting a comparison of input ripple current values between exemplary embodiments of segmented drive system using DSVPWM with different phase shift values. In one embodiment, it is possible to reduce the capacitor ripple current increase and the input ripple current increase by means of introducing a phase shift between the signals of each of the plurality of inverter segments 225. In one embodiment, the phase shift angle value $\alpha$ may be adjusted such that it is optimized. FIGS. 8A and 8B depict the effect of an adjusted phase shift angle value $\alpha$ according to one embodiment. In one embodiment, the use of even an improved phase shift angle value produces a measurable reduction of both the capacitor ripple current and the input ripple current, while the use of an optimal phase shift angle value $\alpha$ may produce the best ripple current results.

In one embodiment, the optimal value for the phase shift angle is determined by the use of a simulated inverter. In one embodiment, a mathematical model of the segmented inverter 220 is used to iterate through values of phase shift angle $\alpha$. The segmented drive system 200 may then use the phase shift angle value that produces the best simulation results in terms of capacitor ripple current and input ripple current. In one embodiment, the optimal phase shift angle value may depend on the quantity of inverter segments 225 in the plurality of inverter segments $225_{1-N}$.

Figure 9A:
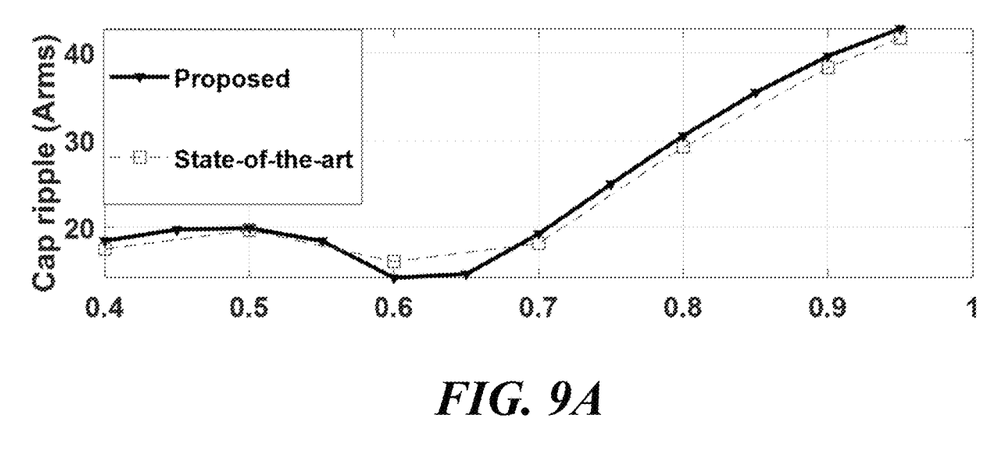
FIG. 9A is a graph depicting a comparison of capacitor ripple current values between an exemplary embodiment of a drive system using standard SVPWM versus an exemplary embodiment of a drive system using Special DSVPWM.
Figure 9B:
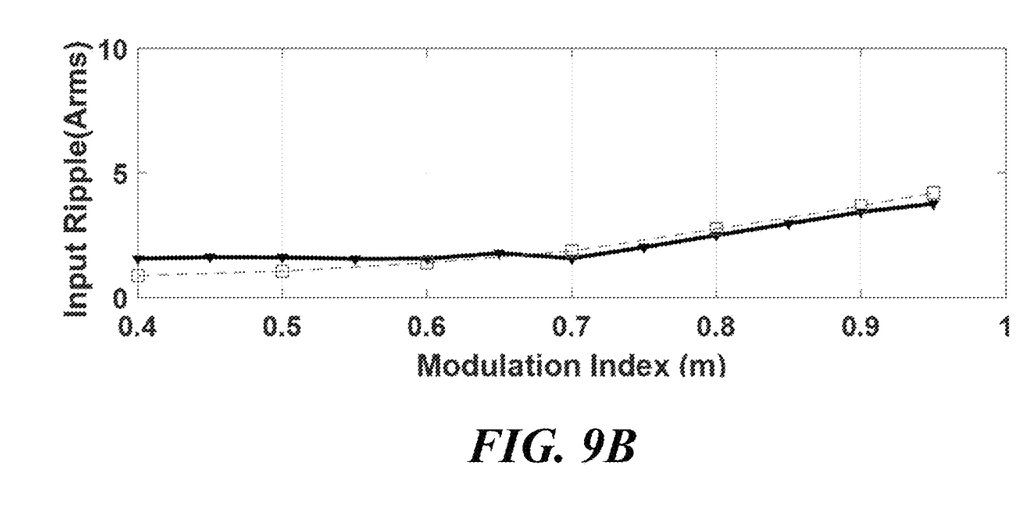
FIG. 9B is a graph depicting a comparison of input ripple current values between an exemplary embodiment of a drive system using standard SVPWM versus an exemplary embodiment of a drive system using Special DSVPWM.

FIG. 9A is a graph depicting a comparison of capacitor ripple current values between an exemplary embodiment of a drive system using standard SVPWM versus an exemplary embodiment of a drive system using Special DSVPWM, wherein Special DSVPWM is a DSVPWM switching scheme implemented on a segmented drive system with an optimal phase shift angle value between carrier signals and modulated signals of the inverter segments. FIG. 9B is a graph depicting a comparison of input ripple current values between an exemplary embodiment of a drive system using standard SVPWM versus an exemplary embodiment of a drive system using Special DSVPWM. As demonstrated by FIGS. 9A and 9B, the use of an optimal phase shift angle value for Special DSVPWM results in nearly unchanged capacitor ripple current values and input ripple current values at all modulation index values, thereby allowing for use of a discontinuous switching scheme to reduce switching loss without incurring ripple current penalties.

Figure 10A:
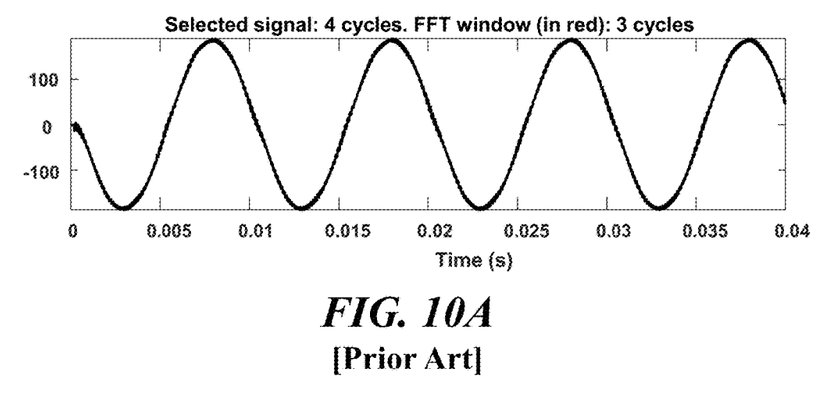
FIG. 10A is a graph of the summed phase current waveform and spectrum of an exemplary prior art embodiment.
Figure 10B:
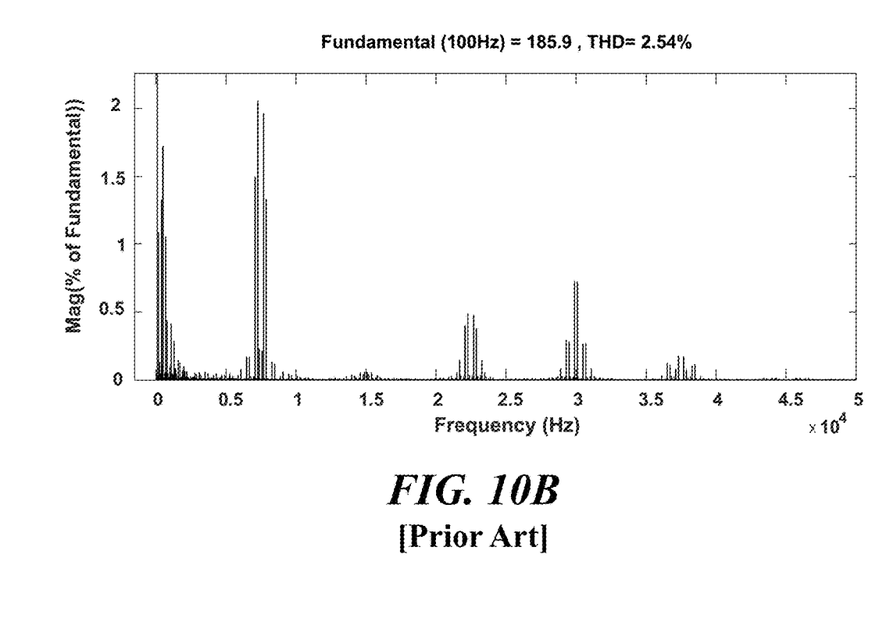
FIG. 10B is a graph of the amplitudes of harmonic frequencies of an exemplary prior art embodiment.

FIG. 10A is a graph of the summed phase current waveform and spectrum of an exemplary prior art embodiment, such as a drive system using standard SVPWM. FIG. 10B is a graph of the amplitudes of harmonic frequencies of an exemplary prior art embodiment. As embodied in FIGS. 10A and 10B, the exemplary prior art drive system is using a switching frequency of 7.5 kHz. At this frequency, the exemplary prior art drive system experiences dominant harmonics at 7.5 kHz with an amplitude of about 1.1% of the amplitude of the fundamental frequency. Major harmonics at 15 kHz are cancelled by phase shift in this embodiment, but some major harmonics remain at 30 kHz with an amplitude of about 0.4% of the amplitude of the fundamental frequency.

Figures 11A, 11B:
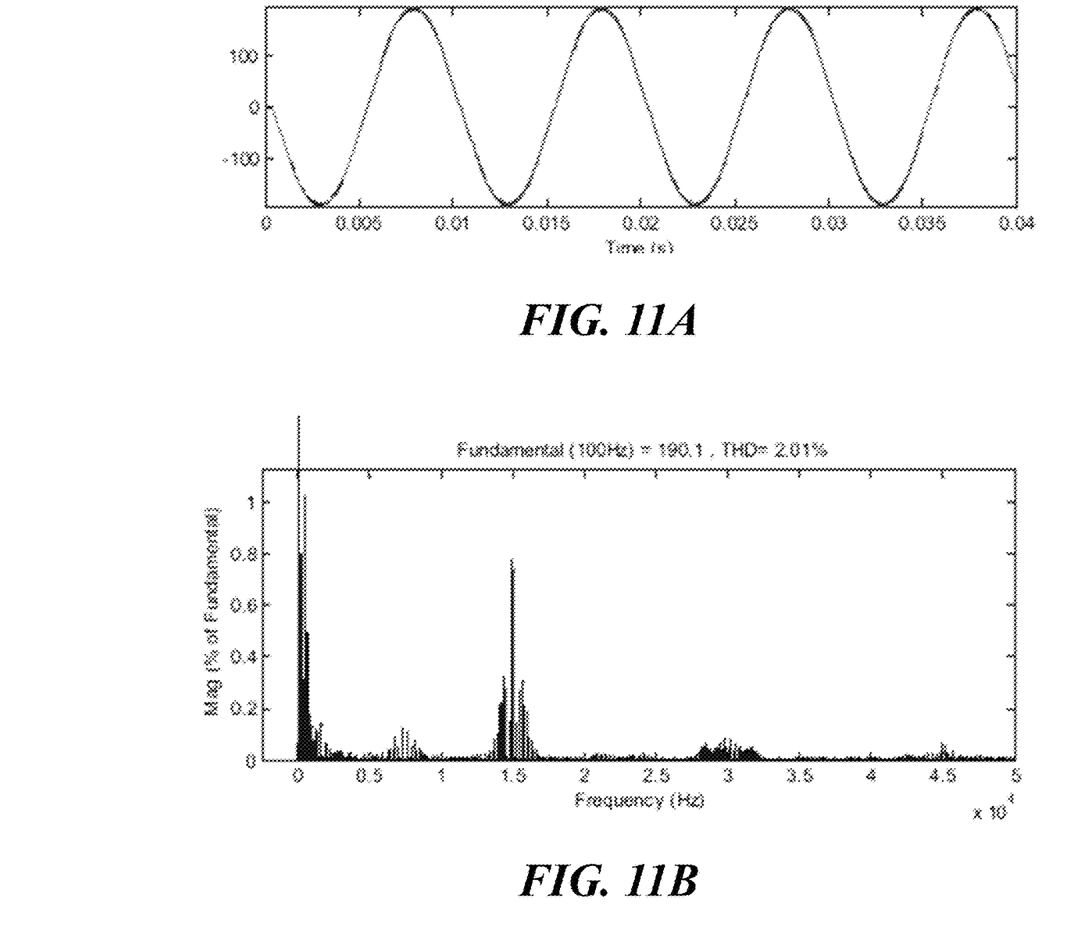
FIG. 11A is a graph of the summed phase current waveform and spectrum of an exemplary embodiment of a segmented drive system using Special DSVPWM.
FIG. 11B is a graph of the amplitudes of harmonic frequencies of an exemplary embodiment of a segmented drive system using Special DSVPWM.

FIG. 11A is a graph of the summed phase current waveform and spectrum of an exemplary embodiment of a segmented drive system using Special DSVPWM. FIG. 11B is a graph of the amplitudes of harmonic frequencies of an exemplary embodiment of a segmented drive system using Special DSVPWM. As embodied in FIGS. 11A and 11B, the dominant harmonic of the exemplary segmented drive system is pushed from the 7.5 kHz value of the system of FIGS. 10A and 10B to a value of 15 kHz, and the amplitude is reduced to about 0.8% of the amplitude of the fundamental frequency. This embodiment may also reduce the amplitudes of the major harmonics at 22.5 kHz, 30 kHz, 37.5 kHz, and 45 kHz to less than 0.2% of the fundamental. These results may be accomplished as a result of use of an optimal phase shift angle leading to harmonic cancellation.

While this disclosure makes reference to exemplary embodiments, it will be understood by those skilled in the art that various changes in form and details may be made therein without departing from the scope of the claimed embodiments.

What is claimed is:

1. A segmented electrical drive system comprising:
   a DC power bus comprising a DC voltage supply and a capacitor connected in parallel with the DC voltage supply;
   an inverter comprising a plurality of inverter segments, wherein each inverter segment includes a plurality of inverter switch pairs each connected in parallel with the DC power bus;
   a motor connected to the inverter, wherein the motor includes a plurality of stator winding segments, wherein a stator winding segment in the plurality of stator winding segments is assigned to each inverter segment, and wherein each stator winding segment includes at least one stator winding for each inverter switch pair in the plurality of inverter switch pairs of the associated inverter segment; and a controller, wherein the controller receives a control signal and sends a switching signal to each of the inverter segments, wherein the control signal corresponds with a desired stator magnetic field vector, wherein the switching signal sent to each inverter segment corresponds with a space vector pulse width modulation (SVPWM) used to produce the desired stator magnetic field vector by means of combining a plurality of base vectors produced by the plurality of stator winding segments, wherein each base vector is produced by an inverter switch pair's activity to generate a pulse width modulated signal according to a SVPWM schedule through its corresponding at least one stator winding, and wherein at least one stator winding in the plurality of stator winding segments is not driven by any inverter switch pair activity from its corresponding inverter switch pair during a given cycle of the SVPWM schedule;

wherein the switching signal to produce the pulse width modulated signal of each inverter switch pair is determined by comparing a carrier signal to a reference signal.

2. The drive system of claim 1, wherein the carrier signals associated with each of the plurality of inverter switch pairs are sawtooth carrier signals.

3. The drive system of claim 1, wherein the carrier signals associated with each of the plurality of inverter switch pairs are reverse sawtooth carrier signals.

4. The drive system of claim 1, wherein the carrier signals and reference signals associated with an inverter segment are at an optimal phase shift angle with respect to the carrier signals and pulse width modulated signals associated with each other inverter segment in the plurality of inverter segments.

5. The drive system of claim 4, wherein the optimal phase shift angle is determined by the use of a mathematical model of the inverter.

6. The drive system of claim 4, wherein the optimal phase shift angle is a fixed value during operation of the drive system.

7. The drive system of claim 4, wherein the implementation of an optimal phase shift angle reduces a ripple current of the capacitor.

8. A vehicle including a segmented electrical drive system, the drive system comprising:

a DC power bus comprising a DC voltage supply and a capacitor connected in parallel with the DC voltage supply;

an inverter comprising a plurality of inverter segments, wherein each inverter segment includes a plurality of inverter switch pairs each connected in parallel with the DC power bus;

a motor connected to the inverter, wherein the motor includes a plurality of stator winding segments, wherein a stator winding segment in the plurality of stator winding segments is assigned to each inverter segment, and wherein each stator winding segment includes at least one stator winding for each inverter switch pair in the plurality of inverter switch pairs of the associated inverter segment; and a controller, wherein the controller receives a control signal and sends a switching signal to each of the inverter segments, wherein the control signal corresponds with a desired stator magnetic field vector, wherein the switching signal sent to each inverter segment corresponds with a space vector pulse width modulation (SVPWM) used to produce the desired stator magnetic field vector by means of combining a plurality of base vectors produced by the plurality of stator winding segments, wherein each base vector is produced by an inverter switch pair's activity to generate a pulse width modulated signal according to a SVPWM schedule through its corresponding at least one stator winding, and wherein at least one stator winding in the plurality of stator winding segments is not driven by any inverter switch pair activity from its corresponding inverter switch pair during a given cycle of the SVPWM schedule;

wherein the switching signal to produce the pulse width modulated signal of each inverter switch pair is determined by comparing a carrier signal to a reference signal.

9. The vehicle of claim 8, wherein the carrier signals associated with each of the plurality of inverter switch pairs are sawtooth carrier signals.

10. The vehicle of claim 8, wherein the carrier signals associated with each of the plurality of inverter switch pairs are reverse sawtooth carrier signals.

11. The vehicle of claim 8, wherein the carrier signals and reference signals associated with an inverter segment are at an optimal phase shift angle with respect to the carrier signals and pulse width modulated signals associated with each other inverter segment in the plurality of inverter segments.

12. The vehicle of claim 11, wherein the optimal phase shift angle is determined by the use of a mathematical model of the inverter.

13. The vehicle of claim 11, wherein the optimal phase shift angle is a fixed value during operation of the drive system.

14. The vehicle of claim 11, wherein the implementation of an optimal phase shift angle reduces a ripple current of the capacitor.

15. A method of operating a segmented electrical drive system, the drive system comprising:

a DC power bus comprising a DC voltage supply and a capacitor connected in parallel with the DC voltage supply;

an inverter comprising a plurality of inverter segments, wherein each inverter segment includes a plurality of inverter switch pairs each connected in parallel with the DC power bus;

a motor connected to the inverter, wherein the motor includes a plurality of stator winding segments, wherein a stator winding segment in the plurality of stator winding segments is assigned to each inverter segment, and wherein each stator winding segment includes at least one stator winding for each inverter switch pair in the plurality of inverter switch pairs of the associated inverter segment; and a controller, wherein the controller receives a control signal and sends a switching signal to each of the inverter segments, wherein the control signal corresponds with a desired stator magnetic field vector, wherein the switching signal sent to each inverter segment corresponds with a space vector pulse width modulation (SVPWM) used to produce the desired stator magnetic field vector by means of combining a plurality of base vectors produced by the plurality of stator winding segments, wherein each base vector is produced by an inverter switch pair's activity to generate a pulse width modulated signal according to a SVPWM schedule through its corresponding at least one stator winding, and wherein at least one stator winding in the plurality of stator winding segments is not driven by any inverter switch pair activity from its corresponding inverter switch pair during a given cycle of the SVPWM schedule;

wherein the switching signal to produce the pulse width modulated signal of each inverter switch pair is determined by comparing a carrier signal to a reference signal.

16. The method of claim 15, wherein the carrier signals associated with each of the plurality of inverter switch pairs are sawtooth carrier signals.

17. The method of claim 15, wherein the carrier signals associated with each of the plurality of inverter switch pairs are reverse sawtooth carrier signals.

18. The method of claim 15, wherein the carrier signals and reference signals associated with an inverter segment are at an optimal phase shift angle with respect to the carrier signals and pulse width modulated signals associated with each other inverter segment in the plurality of inverter segments.

19. The method of claim 18, wherein the optimal phase shift angle is determined by the use of a mathematical model of the inverter.

20. The method of claim 18, wherein the implementation of an optimal phase shift angle reduces a ripple current of the capacitor.

* * * * *